US012096858B2

(12) United States Patent
Hamilton et al.

(10) Patent No.: US 12,096,858 B2
(45) Date of Patent: Sep. 24, 2024

(54) CUSHIONS INCLUDING A COATED ELASTOMERIC CUSHIONING ELEMENT AND RELATED METHODS

(71) Applicant: Purple Innovation, LLC, Alpine, UT (US)

(72) Inventors: Lars Christen Hamilton, Alpine, UT (US); Tanner Rick Wheadon, Lehi, UT (US); John Nathan Abel, Stansbury Park, UT (US); Terry V. Pearce, Alpine, UT (US)

(73) Assignee: Purple Innovation, LLC, Lehi, UT (US)

( * ) Notice: Subject to any disclaimer, the term of this patent is extended or adjusted under 35 U.S.C. 154(b) by 1338 days.

(21) Appl. No.: 15/654,948

(22) Filed: Jul. 20, 2017

(65) Prior Publication Data

US 2019/0021514 A1 Jan. 24, 2019

(51) Int. Cl.
*A47C 27/10* (2006.01)
*A47C 27/15* (2006.01)
(Continued)

(52) U.S. Cl.
CPC ................ *A47C 27/15* (2013.01); *B68G 7/00* (2013.01); *B68G 11/04* (2013.01)

(58) Field of Classification Search
CPC ....... A47C 27/15; A47C 27/144; A47C 27/10; A47C 27/148; A47C 27/088
See application file for complete search history.

(56) References Cited

U.S. PATENT DOCUMENTS 2,617,751 A * 11/1952 Bickett .................. A47C 27/15 428/166
3,049,344 A 8/1962 Hawkins
(Continued)

FOREIGN PATENT DOCUMENTS

CN 1468572 A 1/2004
CN 2726430 Y 9/2005
(Continued)

OTHER PUBLICATIONS

Ocean Chemical Industry, RuberZol RA 97, (Oct. 11, 2008), Ocean Chemical Industry, of Sao Paulo, Brazil, Rev 00 (Year: 2008).*
(Continued)

*Primary Examiner* — Justin C Mikowski
*Assistant Examiner* — Ifeolu A Adeboyejo
(74) *Attorney, Agent, or Firm* — DENTONS Durham Jones Pinegar

(57) ABSTRACT

A cushion includes a cushioning element and a coating material provided on a surface of the cushioning element. The cushioning element includes an elastomeric material forming a plurality of intersecting buckling walls defining a plurality of hollow columns in an expanded form. The coating material includes stearic acid, a metal stearate, propylene glycol, and triethanolamine. The cushioning element is configured to be compressed, such as by a roll-packing machine, into the compressed form and subsequently released from the compressed form to transform to the expanded form. Methods of forming the cushion include forming the cushioning element comprising an elastomeric material, coating a surface of the cushioning element with the coating material, and compressing the cushioning element into a compressed form.

21 Claims, 4 Drawing Sheets

(51) Int. Cl.
*B68G 7/00* (2006.01)
*B68G 11/04* (2006.01)

(56) References Cited

U.S. PATENT DOCUMENTS

| | | | | |
|---|---|---|---|---|
| 3,528,841 | A | 9/1970 | Donaldson et al. | |
| 4,369,284 | A | 1/1983 | Chen | |
| 4,711,067 | A * | 12/1987 | Magni | B65B 63/02 53/116 |
| 4,980,940 | A | 1/1991 | Isshiki | |
| 4,990,399 | A | 2/1991 | Hoopengardner | |
| 5,408,711 | A | 4/1995 | McClelland | |
| 5,492,963 | A | 2/1996 | Ozawa et al. | |
| 5,638,565 | A | 6/1997 | Pekar | |
| 5,749,111 | A * | 5/1998 | Pearce | A43B 13/04 5/654 |
| 5,994,450 | A * | 11/1999 | Pearce | C08L 51/006 524/505 |
| 6,026,527 | A * | 2/2000 | Pearce | B29C 48/08 428/137 |
| 6,098,378 | A | 8/2000 | Wyatt | |
| 6,328,798 | B1 | 12/2001 | Bostrom et al. | |
| 6,723,399 | B2 | 4/2004 | Chundury et al. | |
| 6,865,759 | B2 | 3/2005 | Pearce | |
| 6,898,814 | B2 | 5/2005 | Kawamura et al. | |
| 6,901,722 | B2 * | 6/2005 | Dextraze | B65B 31/06 206/223 |
| 7,076,822 | B2 | 7/2006 | Pearce | |
| 7,666,341 | B2 | 2/2010 | Pearce | |
| 7,730,566 | B2 | 6/2010 | Flick et al. | |
| 7,771,375 | B2 * | 8/2010 | Nishibori | A47C 21/003 5/915 |
| 7,823,233 | B2 | 11/2010 | Flick et al. | |
| 7,827,636 | B2 | 11/2010 | Flick et al. | |
| 7,964,664 | B2 | 6/2011 | Pearce | |
| 8,046,973 | B2 | 11/2011 | Petrolati | |
| 8,075,981 | B2 | 12/2011 | Pearce | |
| 8,087,726 | B2 | 1/2012 | Chen | |
| 8,424,137 | B1 * | 4/2013 | Pearce | A47C 27/085 5/655.5 |
| 8,434,748 | B1 * | 5/2013 | Pearce | A47C 27/20 5/655.5 |
| 8,607,387 | B2 | 12/2013 | Flick et al. | |
| 8,628,067 | B2 * | 1/2014 | Pearce | A47C 27/16 5/655.5 |
| 8,919,750 | B2 | 12/2014 | Pearce et al. | |
| 8,932,692 | B2 | 1/2015 | Pearce | |
| 9,049,944 | B2 | 6/2015 | Chen | |
| 9,796,522 | B2 | 10/2017 | Pearce | |
| 2003/0037377 | A1 * | 2/2003 | Kawamura | A47C 21/046 5/652 |
| 2003/0074863 | A1 | 4/2003 | Mossbeck | |
| 2004/0249036 | A1 | 12/2004 | Higai et al. | |
| 2005/0144911 | A1 | 7/2005 | Dextraze et al. | |
| 2005/0223667 | A1 * | 10/2005 | McCann | A47C 27/144 52/403.1 |
| 2006/0231436 | A1 | 10/2006 | Spinks et al. | |
| 2007/0056096 | A1 | 3/2007 | Assink | |
| 2007/0065625 | A1 * | 3/2007 | Lai | A01K 1/0157 428/71 |
| 2007/0245490 | A1 * | 10/2007 | Oh | A47F 5/0018 5/413 R |
| 2008/0115286 | A1 | 5/2008 | Flick et al. | |
| 2009/0007822 | A1 | 1/2009 | Berke et al. | |
| 2010/0227091 | A1 * | 9/2010 | Pearce | B32B 3/08 428/36.1 |
| 2011/0061170 | A1 * | 3/2011 | Farley | A47C 27/14 5/737 |
| 2011/0197363 | A1 * | 8/2011 | Kokenes | B32B 27/08 428/317.1 |
| 2012/0013565 | A1 | 1/2012 | Westhues et al. | |
| 2012/0135652 | A1 * | 5/2012 | Dandenault | C09D 125/10 524/400 |
| 2013/0000045 | A1 | 1/2013 | Losio | |
| 2013/0043628 | A1 | 2/2013 | Pearce et al. | |
| 2013/0133138 | A1 | 5/2013 | Sugano et al. | |
| 2013/0167302 | A1 * | 7/2013 | Pearce | F16F 3/0873 267/153 |
| 2013/0216734 | A1 | 8/2013 | Van et al. | |
| 2014/0208517 | A1 | 7/2014 | Gross et al. | |
| 2015/0203221 | A1 | 7/2015 | Van De Hey et al. | |
| 2015/0351557 | A1 | 12/2015 | Allen | |
| 2015/0359357 | A1 * | 12/2015 | Feng | A47D 15/001 5/699 |
| 2017/0251824 | A1 * | 9/2017 | Pearce | B65B 63/026 |
| 2017/0251825 | A1 | 9/2017 | Pearce | |
| 2019/0150629 | A1 * | 5/2019 | Pearce | A47C 27/16 |
| 2019/0150631 | A1 * | 5/2019 | Pearce | A47C 27/088 |
| 2019/0150632 | A1 * | 5/2019 | Pearce | A47C 27/06 |

FOREIGN PATENT DOCUMENTS

| | | | |
|---|---|---|---|
| CN | 1727376 | A | 2/2006 |
| CN | 101379234 | A | 3/2009 |
| CN | 102639635 | A | 8/2012 |
| CN | 103214722 | A | 7/2013 |
| CN | 103619216 | A | 3/2014 |
| JP | SHO52-091080 | A | 8/1977 |
| JP | H0994133 | A | 4/1997 |
| JP | HEI10-248682 | A | 9/1998 |
| JP | 11299579 | A | 11/1999 |
| JP | 2002-047348 | A | 2/2002 |
| JP | 2003210283 | A | 7/2003 |
| JP | 2004-010119 | A | 1/2004 |
| JP | 2012-528900 | A | 11/2012 |
| TW | 201018757 | A | 5/2010 |
| WO | 2003083000 | A1 | 8/2005 |
| WO | 2012148915 | A2 | 11/2012 |
| WO | 2013157534 | A1 | 10/2013 |
| WO | 2015051090 | A1 | 4/2015 |
| WO | 2017155820 | A1 | 9/2017 |

OTHER PUBLICATIONS

Pearce, Bag for Shipping a Cushion and Related Methods, U.S. Appl. No. 15/063,114, filed Mar. 7, 2016.

Pearce, Mattresses and Mattress Toppers Including Knitted Fabric, and Related Methods, U.S. Appl. No. 15/062,621, filed Mar. 7, 2016.

Chinese National Intellectual Property Administration, "First Office Action," Chinese application No. 2018107865369, Jan. 20, 2020.

Korean Intellectual Property Office, "Grounds for Rejection," Korean Application No. 10-2019-7028936, Aug. 31, 2020.

US Plastics Corporation, "What are the differences between HDPE, LDPE, XLPE, LLDPE, and UHMWPE?," Aug. 13, 2008, available at https://www.usplastic.com/knowledgebase/article.aspx?contentkey=508.

USPTO as International Searching Authority, "International Search Report and Written Opinion," International Application No. PCT/US2017/020726, May 29, 2017.

Japan Patent Office, "Office Action," Japanese Application No. 2018-545840, Sep. 4, 2019.

Canadian Intellectual Property Office, "Application Found Allowable," Canadian Aplication No. 3,016,702, Dec. 23, 2019.

Japan Patent Office, "Final Rejection," Japanese Application No. 2018-545840, Jan. 6, 2020.

Korean Intellectual Property Office, "Notice of Allowance," Korean Application No. 10-2018-7028893, Mar. 18, 2020.

European Patent Office, "Supplemental European Search Report," European Application No. 17763792.3, Sep. 5, 2019.

Taiwan Intellectual Property Office, "Office Action," Taiwan Application No. 106107365, May 28, 2020.

Chinese National Intellectual Property Administration, "First Office Action," Chinese Application No. 201780016021.4, Jun. 3, 2020.

USPTO as International Searching Authority, "International Search Report and Written Opinion," International Application No. PCT/US2018/041455, Oct. 17, 2018.

Chinese National Intellectual Property Administration, "Second Office Action," Chinese Application No. 201810786536.9, Sep. 15, 2020.

(56) References Cited

OTHER PUBLICATIONS

Taiwan Intellectual Property Office, Office Action, Taiwan patent application No. 107125120, Mar. 8, 2019.
European Patent Office, Supplementary European Search Report, European patent application No. 18835912.9, Jun. 29, 2020.
IP Australia, "Examination report No. 1," Australian Patent Application No. 2018304056, Mar. 31, 2020.
Japan Patent Office, "Reasons for Rejection," Japanese Application No. 2019-545329, Jun. 2, 2022.
Canadian Intellectual Property Office, "Examiner's Report," Canadian Application No. 3054345, Nov. 5, 2020.
Chinese National Intellectual Property Administration, "Third Office Action," Chinese Application No. 201810786536.9, Mar. 4, 2021.
IP Australia, "Examination report No. 1," Australian Application No. 2017228983, Oct. 31, 2018.
IP Australia, "Examination report No. 2," Australian Application No. 2017228983, Jul. 5, 2019.
IP Australia, "Examination report No. 3," Australian Application No. 2017228983, Sep. 24, 2019.
Canadian Intellectual Property Office, "Examiner's Report," Canadian Application No. 3,016,702, Jun. 14, 2019.
Chinese National Intellectual Property Administration, "Second Office Action," Chinese Application No. 201780016021.4, Apr. 9, 2021.
Korean Intellectual Property Office, "Notice of Preliminary Rejection," Korean Application No. 10-2018-7028893, Sep. 11, 2019.
Korean Intellectual Property Office, "Notice of Final Rejection," Korean Application No. 10-2019-7028936, Apr. 30, 2021.
China National Intellectual Property Administration, "Notification to Go through Formalities of Registration," Sep. 30, 2021.
China National Intellectual Property Administration, "Notification of Granting Invention Patent Right," Sep. 30, 2021.
China National Intellectual Property Administration, "Notification to Go through Formalities of Registration," Chinese Application No. 201810786536.9, Sep. 30, 2021.
China National Intellectual Property Administration, "Notification of Granting Invention Patent Right," Chinese Application No. 201810786536.9, Sep. 30, 2021.
Korean Intellectual Property Office, "Notice of Allowance," Korean Application No. 10-2018-7028893, Jul. 6, 2021.
Canadian Intellectual Property Office, "Commissioner's Notice—Application Found Allowable," Canadian Application No. 3016702, Jun. 22, 2021.
Chinese National Intellectual Property Administration, "Third Office Action," Chinese Application No. 201780016021.4, Aug. 5, 2021.
European Patent Office, "Communication pursuant to Article 94(3)EPC," European Application No. 18835912.9, Feb. 10, 2023.
Japan Patent Office, "Notice of Allowance," Japanese Application No. 2019-545329, Mar. 30, 2023.
European Patent Office, "Communication under to Rule 71(3) EPC," European Application No. 18835912.9, Sep. 5, 2022.

* cited by examiner

CUSHIONS INCLUDING A COATED ELASTOMERIC CUSHIONING ELEMENT AND RELATED METHODS

TECHNICAL FIELD

Embodiments of the disclosure relate generally to elastomeric cushioning elements for compressible cushions, including mattresses, mattress toppers, seat cushions, etc., to coatings for the cushioning elements, and to methods of forming cushions including coated cushioning elements.

BACKGROUND

Cushioning materials have a variety of uses, such as for mattresses, seating surfaces, shoe inserts, packaging, medical devices, etc. Cushioning materials may be formulated and/or configured to reduce peak pressure on a cushioned body, which may increase comfort for humans or animals, and may protect objects from damage. Cushioning materials may be formed of materials that deflect or deform under load, such as polyethylene or polyurethane foams (e.g., convoluted foam), vinyl, rubber, springs, natural or synthetic fibers, fluid-filled flexible containers, etc. Different cushioning materials may have different responses to a given pressure, and some materials may be well suited to different applications. Cushioning materials may be used in combination with one another to achieve selected properties.

U.S. Pat. No. 7,730,566, "Multi-Walled Gelastic Material," issued Jun. 8, 2010, the disclosure of which is incorporated herein in its entirety by this reference, describes cushion structures having interconnected walls that buckle. A first wall buckles when a threshold force is applied. Buckling of the first wall may cause buckling of a second wall, which may decrease the chance that the first wall will "bottom out." Bottoming out would increase pressure on the portion of the cushioned object over the buckled portion of the cushion. One side of the cushion has walls spaced relatively close together, and the opposite side has walls spaced farther apart. That is, some walls of the cushion extend only partially through the cushion. The wider-spaced portions of the walls may buckle more easily than the closer-spaced portions of the walls when an irregularly shaped object presses against the walls.

U.S. Pat. No. 8,919,750, "Cushioning Elements Comprising Buckling Walls and Methods of Forming Such Cushioning Elements," issued Dec. 30, 2014, the disclosure of which is incorporated herein in its entirety by this reference, describes a cushioning element having a top cushioning surface and a bottom base surface, and which includes an elastomeric material and a stabilizing material. Interconnected buckling walls formed of the elastomeric material are connected to the stabilizing material.

Cushioning materials, such as mattresses, are generally bulky objects that are difficult and costly to transport from a manufacturer to a retailer or a customer. Traditionally, mattresses have been packaged, shipped, and sold in a flat configuration, such that the mattresses have the same size and dimension in shipping as they do when placed atop a box spring or other mattress support to make a bed. Recently, there have been efforts directed toward compressing mattresses, and there have been methods described for compressing foam and coil mattresses for packaging. Methods have also been disclosed for compressing the foam and coil mattresses into a rolled shape. Examples of methods of roll-packing mattresses include: U.S. Pat. No. 8,046,973 to Petrolati; U.S. Patent Publication No. 2003/0074863 to Mossbeck; and U.S. Patent Publication No. 2015/0203221 to Van De Hey et al.

BRIEF SUMMARY

In some embodiments, a cushion includes a cushioning element and a coating material over at least one surface of the cushioning element. The cushioning element comprises an elastomeric material forming a plurality of intersecting buckling walls defining a plurality of hollow columns in an expanded form. The elastomeric material comprises an elastomeric polymer and a plasticizer. The coating material comprises stearic acid, a metal stearate, propylene glycol, and triethanolamine.

In some embodiments, a compressed cushion includes a cushioning element comprising an elastomeric material and a coating comprising stearic acid, a metal stearate, propylene glycol, and triethanolamine provided on a surface of the cushioning element. The elastomeric material comprises an elastomeric polymer and a plasticizer.

Methods of forming a cushion are also disclosed. The method includes forming a cushioning element comprising an elastomeric material. The cushioning element comprises a plurality of intersecting buckling walls defining a plurality of hollow columns in an expanded form. The method further includes coating a surface of the cushioning element with a coating composition comprising stearic acid, a metal stearate, propylene glycol, and triethanolamine. The method further includes compressing the cushioning element into a compressed form.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
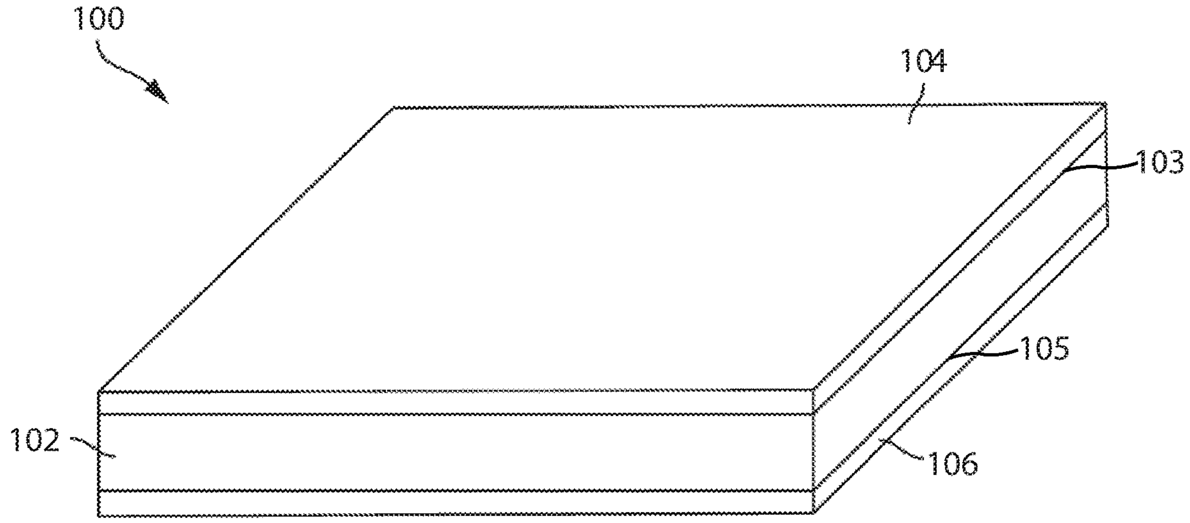
FIG. 1 is a perspective view of a cushion in an expanded form according to an embodiment of the present disclosure.

As used herein, the term "cushioning element" means and includes any deformable device intended for use in cushioning one body relative to another. As a non-limiting example, cushioning elements (e.g., mattresses, seat cushions, etc.) include materials intended for use in cushioning a person, animal, or object relative to another object (e.g., a bed frame, chair seat, etc.) that might otherwise abut against the person, animal, or object.

As used herein, the term "elastomeric polymer" means and includes a polymer capable of recovering its original size and shape after deformation. In other words, an elastomeric polymer is a polymer having elastic or viscoelastic properties. Elastomeric polymers may also be referred to as "elastomers" in the art. Elastomeric polymers include, without limitation, homopolymers (polymers having a single chemical unit repeated) and copolymers (polymers having two or more chemical units).

As used herein, the term "elastomeric block copolymer" means and includes an elastomeric polymer having groups or blocks of homopolymers linked together, such as A-B diblock copolymers and A-B-A triblock copolymers. A-B diblock copolymers have two distinct blocks of homopolymers. A-B-A triblock copolymers have two blocks of a single homopolymer (A) each linked to a single block of a different homopolymer (B).

As used herein, the term "plasticizer" means and includes a substance added to another material (e.g., an elastomeric polymer) to increase a workability of the material. For example, a plasticizer may increase the flexibility, softness, or extensibility of the material. Plasticizers include, without limitation, hydrocarbon fluids, such as mineral oils. Hydrocarbon plasticizers may be aromatic or aliphatic.

As used herein, the term "elastomeric material" means and includes elastomeric polymers and mixtures of elastomeric polymers with plasticizers and/or other materials. Elastomeric materials are elastic (i.e., capable of recovering size and shape after deformation). Elastomeric materials include, without limitation, materials referred to in the art as "elastomer gels," "gelatinous elastomers," or simply "gels."

As used herein, any relational term, such as "first," "second," "top," "bottom," etc., is used for clarity and convenience in understanding the disclosure and accompanying drawings and does not connote or depend on any specific preference, orientation, or order, except where the context clearly indicates otherwise.

As used herein, the term "and/or" means and includes any and all combinations of one or more of the associated listed items.

The illustrations presented herein are not meant to be actual views of any particular component, device, or system, but are merely idealized representations employed to describe embodiments of the present disclosure. Elements common between figures may retain the same numerical designation.

The present disclosure describes a cushion that may be roll-packed, folded, or otherwise compressed for display, storage, and/or shipping to a customer. For example, the cushion may be roll-packed into a cylindrical shape. The roll-packed cushion may be provided in a cylindrical bag. Cylindrical bags for shipping roll-packed cushions are described in, for example, U.S. patent application Ser. No. 15/063,114, "A Bag for Shipping a Cushion and Related Methods," filed Mar. 7, 2016, assigned to the assignee of the present application, the entire disclosure of which is hereby incorporated herein by this reference. Cushions compressed and disposed in cylindrical bags may be easier to handle than cushions, such as mattresses that are traditionally packaged, shipped, and sold in a flat configuration.

FIG. 1 illustrates a perspective view of a cushion 100 according to some embodiments of the present disclosure. The cushion 100 may comprise an elastomeric cushioning element 102 between a top layer 104 and a bottom layer 106. The top layer 104 may be provided on (e.g., attached to) a top surface 103 of the elastomeric cushioning element 102. The bottom layer 106 may be provided on a bottom surface 105 of the elastomeric cushioning element 102.

In some embodiments, the top layer 104 and the bottom layer 106 may comprise a foam material. In other embodiments, the top layer 104 may comprise a stretchable material secured to or integral with the elastomeric cushioning element 102. Such a stretchable material is described in U.S. patent application Ser. No. 15/062,621, "Mattresses and Mattress Toppers Including Knitted Fabric, and Related Methods," filed Mar. 7, 2016, assigned to the assignee of the present application, the entire disclosure of which is incorporated herein by this reference. In yet other embodiments, the cushion 100 may comprise additional layers.

Figure 2:
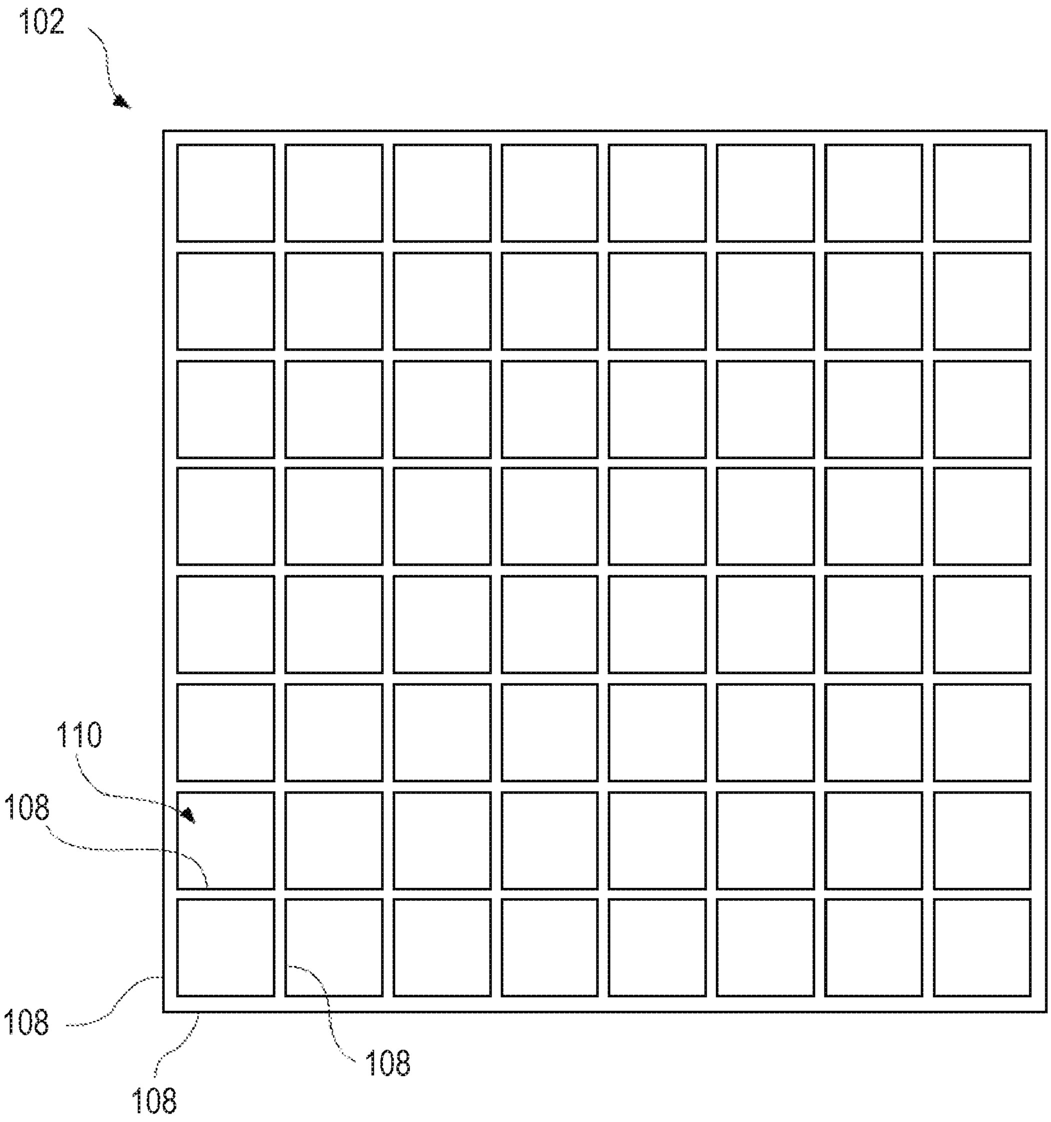
FIG. 2 is a top view of an elastomeric cushioning element of the cushion of FIG. 1 according to an embodiment of the present disclosure.

FIG. 2 illustrates a simplified top view of the elastomeric cushioning element 102 having buckling walls 108. The buckling walls 108 of the elastomeric cushioning element 102 may be interconnected to one another and may define hollow columns 110 or voids in an expanded form. As used herein, the term "expanded form" means and includes a state in which a cushioning element 102 has its original size and shape and wherein the buckling walls 108 are separated and define hollow columns 110.

FIG. 2 illustrates buckling walls 108 oriented in two directions, intersecting at right angles, and defining square voids 110. However, the buckling walls 108 may intersect at other angles and define voids 110 of other shapes, such as triangles, parallelograms, hexagons, etc. The elastomeric cushioning element 102 may comprise additional structures and configurations such as those structures and configurations described in, for example, U.S. Pat. No. 8,434,748, "Cushions Comprising Gel Springs," issued May 7, 2013; U.S. Pat. No. 8,628,067, "Cushions Comprising Core Structures and Related Methods," issued Jan. 14, 2014; U.S. Pat. No. 8,919,750, "Cushioning Elements Comprising Buckling Walls and Methods of Forming Such Cushioning Elements," issued Dec. 30, 2014; and U.S. Pat. No. 8,932,692, "Cushions Comprising Deformable Members and Related Methods," issued Jan. 13, 2015, the entire disclosures of each of which are incorporated herein by this reference.

The buckling walls 108 may be formed of an elastomeric material. Elastomeric materials are described in, for example, U.S. Pat. No. 5,994,450, "Gelatinous Elastomer and Methods of Making and Using the Same and Articles Made Therefrom," issued Nov. 30, 1999; U.S. Pat. No. 7,964,664, "Gel with Wide Distribution of MW in Mid-Block" issued Jun. 21, 2011; U.S. Pat. No. 4,369,284, "Thermoplastic Elastomer Gelatinous Compositions" issued Jan. 18, 1983; U.S. Pat. No. 8,919,750, "Cushioning Elements Comprising Buckling Walls and Methods of Forming Such Cushioning Elements," issued Dec. 30, 2014; the entire disclosures of each of which are incorporated herein by this reference. The elastomeric material may include an elastomeric polymer and a plasticizer. The elastomeric material may be a gelatinous elastomer (also referred to in the art as gel, elastomer gel, or elastomeric gel), a thermoplastic elastomer, a natural rubber, a synthetic elastomer, a blend of natural and synthetic elastomers, etc.

The elastomeric polymer may be an A-B-A triblock copolymer such as styrene ethylene propylene styrene (SEPS), styrene ethylene butylene styrene (SEBS), and styrene ethylene ethylene propylene styrene (SEEPS). For example, A-B-A triblock copolymers are currently commercially available from Kuraray America, Inc., of Houston, Tex., under the trade name SEPTON® 4055, and from Kraton Polymers, LLC, of Houston, Tex., under the trade names KRATON® E1830, KRATON® G1650, and KRATON® G1651. In these examples, the "A" blocks are styrene. The "B" block may be rubber (e.g., butadiene, isoprene, etc.) or hydrogenated rubber (e.g., ethylene/propylene or ethylene/butylene or ethylene/ethylene/propylene) capable of being plasticized with mineral oil or other hydrocarbon fluids. The elastomeric material may include elastomeric polymers other than styrene-based copolymers, such as non-styrenic elastomeric polymers that are thermoplastic in nature or that can be solvated by plasticizers or that are multi-component thermoset elastomers.

The elastomeric material may include one or more plasticizers, such as hydrocarbon fluids. For example, elastomeric materials may include aromatic-free food-grade white paraffinic mineral oils, such as those sold by Sonneborn, Inc., of Mahwah, N.J., under the trade names BLANDOL® and CARNATION®.

In some embodiments, the elastomeric material may have a plasticizer-to-polymer ratio from about 0.1:1 to about 50:1 by weight. For example, elastomeric materials may have plasticizer-to-polymer ratios from about 1:1 to about 30:1 by weight, or even from about 1.5:1 to about 10:1 by weight. In further embodiments, elastomeric materials may have plasticizer-to-polymer ratios of about 4:1 by weight.

The elastomeric material may have one or more fillers (e.g., lightweight microspheres). Fillers may affect thermal properties, density, processing, etc., of the elastomeric material. For example, hollow microspheres (e.g., hollow glass microspheres or hollow acrylic microspheres) may decrease the thermal conductivity of the elastomeric material by acting as an insulator because such hollow microspheres (e.g., hollow glass microspheres or hollow acrylic microspheres) may have lower thermal conductivity than the plasticizer or the polymer. As another example, metal particles (e.g., aluminum, copper, etc.) may increase the thermal conductivity of the resulting elastomeric material because such particles may have greater thermal conductivity than the plasticizer or polymer. Microspheres filled with wax or another phase-change material (i.e., a material formulated to undergo a phase change near a temperature at which a cushioning element may be used) may provide temperature stability at or near the phase-change temperature of the wax or other phase-change material within the microspheres (i.e., due to the heat of fusion of the phase change). The phase-change material may have a melting point from about 20° C. to about 45° C.

The elastomeric material may also include antioxidants. Antioxidants may reduce the effects of thermal degradation during processing or may improve long-term stability. Antioxidants include, for example, pentaerythritol tetrakis(3-(3,5-di-tert-butyl-4-hydroxyphenyl) propionate), commercially available as IRGANOX® 1010, from BASF Corp., of Iselin, N.J. or as EVERNOX®-10, from Everspring Corp. USA, of Los Angeles, Calif.; octadecyl-3-(3,5-di-tert-butyl-4-hydroxyphenyl)propionate, commercially available as IRGANOX® 1076, from BASF Corp. or as EVERNOX® 76, from Everspring Chemical; and tris(2,4-di-tert-butylphenyl)phosphite, commercially available as IRGAFOS® 168, from BASF Corp. or as EVERFOS® 168, from Everspring Chemical. One or more antioxidants may be combined in a single formulation of elastomeric material. The use of antioxidants in mixtures of plasticizers and polymers is described in columns 25 and 26 of U.S. Pat. No. 5,994,450, previously incorporated by reference. The elastomeric material may include up to about 5 wt % antioxidants. For instance, the elastomeric material may include from about 0.10 wt % to about 1.0 wt % antioxidants.

In some embodiments, the elastomeric material may include a resin. The resin may be selected to modify the elastomeric material to slow a rebound of the cushioning element 102 after deformation. The resin, if present, may include a hydrogenated pure monomer hydrocarbon resin, such as those commercially available from Eastman Chemical Company, of Kingsport, Tenn., under the trade name REGALREZ®. The resin, if present, may function as a tackifier, increasing the stickiness of a surface of the elastomeric material.

In some embodiments, the elastomeric material may include a pigment or a combination of pigments. Pigments may be aesthetic and/or functional. That is, pigments may provide the cushioning element 102 with an appearance appealing to consumers. In addition, a cushioning element 102 having a dark color may absorb radiation differently than a cushioning element 102 having a light color.

The elastomeric material may include any type of gelatinous elastomer. For example, the elastomeric material may include a melt-blend of one part by weight of a styrene-ethylene-ethylene-propylene-styrene (SEEPS) elastomeric triblock copolymer (e.g., SEPTON® 4055) with four parts by weight of a 70-weight straight-cut white paraffinic mineral oil (e.g., CARNATION® white mineral oil) and, optionally, pigments, antioxidants, and/or other additives.

The elastomeric material may include a material that may return to its original shape after deformation, and that may be elastically stretched. The elastomeric material may be rubbery in feel, but may deform to the shape of an object applying a deforming pressure better than conventional rubber materials, and may have a durometer hardness lower than conventional rubber materials. For example, the elastomeric material may have a hardness on the Shore A scale of less than about 50, from about 0.1 to about 50, or less than about 5.

In some embodiments, the cushioning element 102 may be compressed. For example, the cushioning element 102 may be roll-packed into a cylindrical shape. Methods of roll-packing a mattress are described in, for example, U.S. Pat. No. 8,046,973, "Machine for Packaging Mattresses," issued Nov. 1, 2011; U.S. Patent Publication No. 2003/0074863, "Method for Roll Packing Foam Cores," published Apr. 24, 2003; U.S. Patent Publication No. 2015/0203221, "System and Method for Packaging a Foam Product," published Jul. 23, 2015; and U.S. patent application Ser. No. 15/063,114, "A Bag for Shipping a Cushion and Related Methods," filed Mar. 7, 2016, assigned to the assignee of the present application; the entire disclosures of each of which are incorporated herein by this reference.

In some embodiments, the roll-packing machine may apply a load sufficient to transform the cushioning element 102 to a compressed form. As used herein, the term "compressed form" means and includes a state in which the cushioning element 102 has a size and shape different from its original size and shape, wherein adjacent buckling walls 108 are pressed together and may be collapsed such that voids 110 may not exist. As described in U.S. patent application Ser. No. 15/063,114, previously incorporated herein, the cushion 100 including the cushioning element 102 in compressed form may be packaged, such as in a cylindrical bag, and shipped to a customer. To use the cushion 100, the customer may remove the cushion 100 from the packaging and allow the cushion 100 and the cushioning element 102 to return to its original size and shape.

It has been observed that the elastomeric material, according to embodiments of the present disclosure, may be sufficiently sticky such that the cushioning element 102 may not return to the expanded form after the cushion 100 is removed from the bag. That is, the buckling walls 108 may stick to one another or remain stuck to one another after the cushion 100 is removed from the bag. In some embodiments, the cushioning element 102 may not return to the expanded form within a reasonable amount of time (e.g., less than approximately eight hours). In other embodiments, the elastomeric cushioning element 102 may not return to the expanded form without manually or mechanically manipulating (e.g. pulling on) the cushioning element 102 to separate the buckling walls 108. However, when the cushioning element 102 is formed as part of the cushion 100, the layers 104 or 106 may inhibit direct access to the elastomeric cushioning element 102 and may hinder manipulation of the elastomeric cushioning element 102 in order to separate the buckling walls 108. This sticking together of polymeric materials is referred to in the art as "blocking." To enable the elastomeric cushioning element 102 to return to the expanded form from the compressed form, a surface of the elastomeric cushioning element 102 may have a coating material on surfaces of the buckling walls 108. In particular, the coating material may be a thin film covering all or portions of the buckling walls 108. For example, the sides of the buckling walls 108 defining voids 110 in the cushioning element 102 may have the coating material thereon.

The coating material may include a blend of fatty acids and a metal stearate, typically in a water-based mixture. For example, the coating material may include stearic acid, a metal stearate (e.g., magnesium stearate, calcium stearate, or calcium stearate), propylene glycol, and triethanolamine. In some embodiments, the coating material may be substantially free of zinc stearate. Such a coating material is available as a slurry from Ocean Chemical Industry, of Sao Paulo, Brazil, under the trade name RuberZol RA 137. The coating material may be formulated to be non-toxic. The coating material may be formulated to hinder adhesion of the buckling walls 108 when the cushioning element 102 is in a compressed form such that the buckling walls 108 are pressed together.

In other embodiments, the coating material may include materials commonly used as mold release, such as a clay-based material (e.g., talc), fatty acids (e.g., stearic acid, palmitic acid, myristic acid, etc.).

Figure 3:
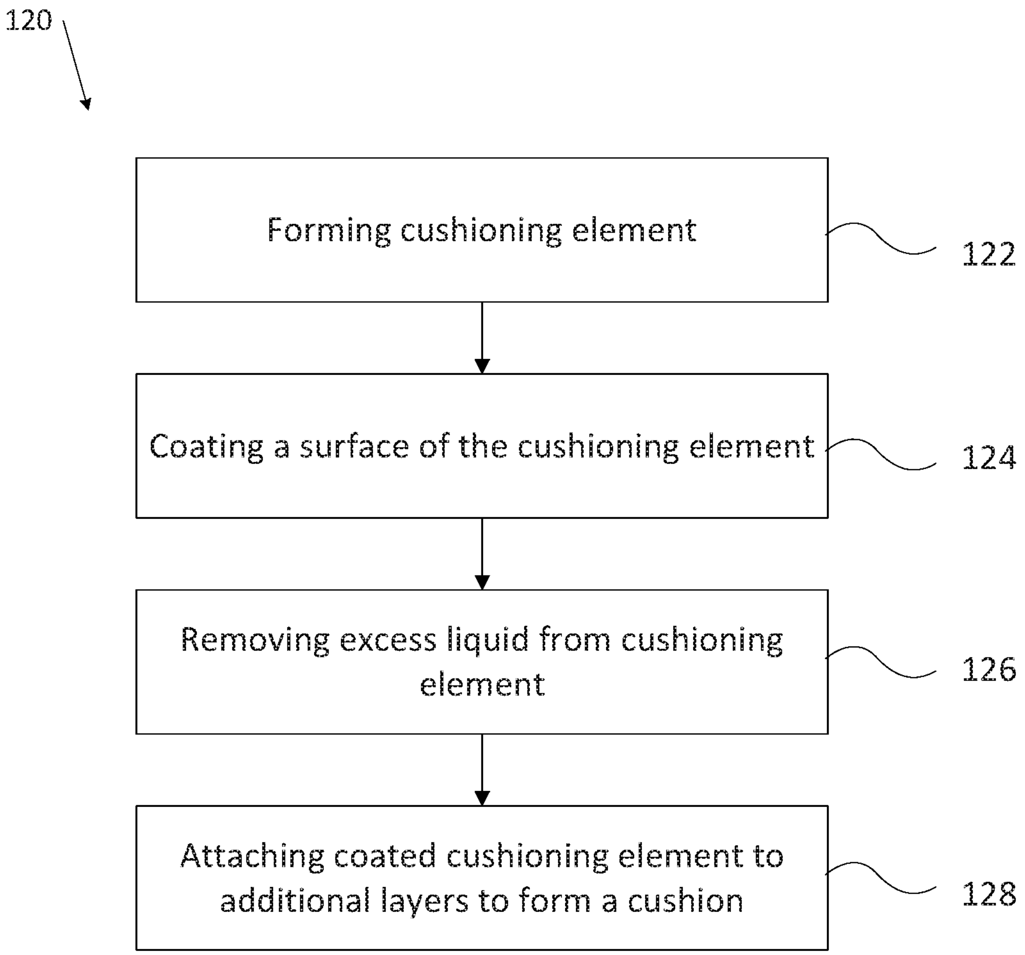
FIG. 3 is a flowchart of a method of forming a cushion according to an embodiment of the present disclosure.

FIG. 3 illustrates a flowchart of a method 120 of applying the coating material to a surface of the cushioning element 102 of FIG. 2. At action 122, the cushioning element 102 may be formed. In some embodiments, the cushioning element 102 may be molded. By way of non-limiting example, the cushioning elements 102 may be molded as described in U.S. Pat. No. 8,919,750, previously incorporated by reference. A molten elastomeric gel may be injected into a mold by the processes described in, for example, U.S. Pat. No. 7,666,341, "Screed Mold Method," issued Feb. 23, 2010; or U.S. Pat. No. 8,919,750, "Cushioning Elements Comprising Buckling Walls and Methods of Forming Such Cushioning Elements," issued Dec. 30, 2014; the entire disclosures of each of which are incorporated herein by this reference. The buckling walls 108 may be formed by the injection of the molten elastomeric gel into the mold. The elastomeric gel may be solidified (e.g., by cooling) and removed from the mold to form the cushioning element 102. The cushioning element 102 may be formed without the use of a mold release.

At action 124, one or more surfaces of the cushioning element 102 may be coated with the coating material. In some embodiments, the cushioning element 102 may be disposed in a bath containing a coating composition (e.g., a coating material plus a carrier, solvent, diluent, etc., that can be removed from the coating material, such as by evaporation). In other embodiments, the cushioning element 102 may be sprayed with the coating composition, the coating composition may be poured over the cushioning element 102, or the cushioning element 102 and the coating composition may be mixed in a rotating drum.

The coating composition may include the coating material and one or more additional materials. For example, the coating composition may include water, stearic acid, a metal stearate, propylene glycol, and triethanolamine. In some embodiments, the coating composition may contain at least about 85% water by weight, at least about 90% water by weight, at least about 95% water by weight, or even at least about 97% water by weight. The water may be used to disperse the coating material. The amount of water in the coating composition may at least partially determine the amount of the coating material that will remain on the cushioning element 102. In some embodiments, the coating composition may include another solvent that can evaporate, such as an alcohol, in addition to or instead of water.

The cushioning element 102 may be contacted with the coating composition immediately or within about 180 minutes after the cushioning element 102 has been formed (e.g., removed from the mold). In other embodiments, the cushioning element 102 may be contacted with the coating composition more than 180 minutes after the cushioning element 102 has been formed.

In embodiments in which the cushioning element 102 is disposed into a bath, the bath may be sized and configured to accommodate at least one cushioning element 102. In some embodiments, the bath may be sized and configured to accommodate at least four cushioning elements 102. The number of cushioning elements 102 that may be provided in the bath and simultaneously coated may depend on the dimensions of the cushion element 102. In some embodiments, the cushioning element 102 may continuously pass through the cleaning composition.

The cushioning element 102 may have any selected dimensions based on the intended use. For example, if the cushion 100 is a mattress for a king size bed, the cushioning element 102 may be approximately 76 inches (193 cm) by about 80 inches (203 cm), with a thickness of approximately 2 inches (5.08 cm), and weigh approximately 80 lbs. If the cushion 100 is a mattress for a queen size bed, the cushioning element 102 may be approximately 60 inches (152 cm) by 80 inches (203 cm), with a thickness of approximately 2 inches (5.08 cm), and weigh approximately 60 lbs. If the cushion 100 is a mattress for an extra-long twin size bed, the cushioning element 102 may be approximately 38 inches (96.5 cm) by 80 inches (203 cm), with a thickness of approximately 2 inches (5.08 cm), and weigh approximately 40 lbs. In some embodiments, the cushioning element 102 may have any other selected thickness, such as approximately 3 inches (7.62 cm) or approximately 4 inches (10.16 cm), and weights may scale accordingly.

Figure 4:
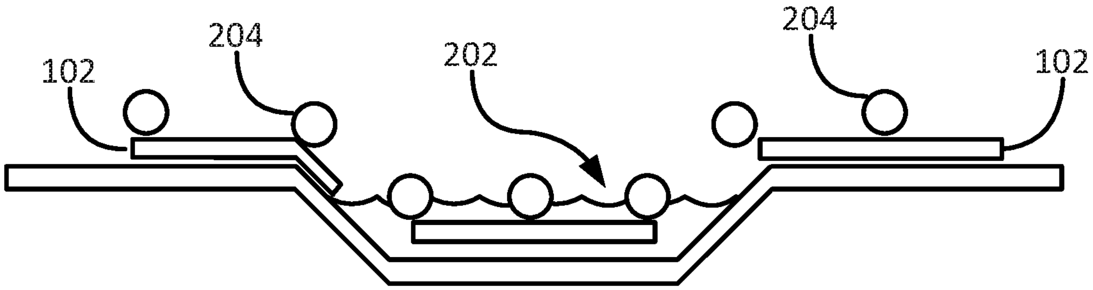
FIG. 4 is a simplified schematic view of some processing equipment that may be used to form a cushion disclosed herein.

Various surfaces of the cushioning element 102, including the buckling walls 108, the top surface 103, and the bottom surface 105, may be coated with the coating composition, which includes the coating material. In some embodiments, and as illustrated in FIG. 4, the cushioning element 102 may be coated by passing the cushioning element 102 into a bath 202 of the coating composition. The cushioning element 102 may be guided into and out of the bath 202 by one or more rollers 204. The rollers 204 may be configured to push the cushioning element 102 under the surface of the coating composition, such that the cushioning element 102 is at least partially immersed in the coating composition. Some of the rollers 204 may be connected to a drive mechanism (e.g., a belt or shaft connected to a motor) to continuously move the cushioning element 102 through the bath 202 (e.g., to deliver the cushioning element 102 to the bath 202 and lift the cushioning element 102 out of the bath 202). The cushioning element 102 may become coated with the coating composition after exposure for a short period of time, such as within about 30 seconds, within about 5 seconds, or even within about 1 second. If the cushioning element 102 includes corners, crevices, holes, etc., having relatively small dimensions, the exposure time of the cushioning element 102 to the coating composition may be increased. In some embodiments, the cushioning element 102 may be contacted with the coating composition multiple times to sufficiently flow and penetrate to cover the entire cushioning element 102. The cushioning element 102 need not sit in the coating composition once covered.

The continuous process illustrated in FIG. 4 may have advantages with respect to process control, because the amount and concentration of the coating composition can be controlled by automatic valves, pumps, etc., and cushioning elements 102 can be more consistently and uniformly coated, as compared to batch processes.

Batch processes may be used, and may be particularly beneficial for testing and scale-up purposes. Any container may be used to contain the coating composition, so long as the container can hold at least a portion of the cushioning element 102 to be coated. For example, a horse trough may be partially filled with the coating composition, and a cushioning element 102 for use in a king-size mattress may be dunked in the horse trough. As another example, a 5-gallon bucket may be partially filled with the coating composition, and a cushioning element 102 for use in a seat cushion may be dunked in the bucket.

In some embodiments, the cushioning element 102 may be coated without using a bath 202. For example, the coating composition may be sprayed onto the surface of the cushioning element 102 using a compressed air sprayer. In other embodiments, the coating composition may be shaken or poured over a surface of the cushioning element 102. The coating composition may also be brushed or rubbed onto the surface of the cushioning element 102 mechanically or manually.

At action 126 (FIG. 3), a portion of the coating composition (typically the water or other solvent) may be removed from the cushioning element 102. In some embodiments, excess coating composition may be removed by manually shaking or blowing on the cushioning element 102. In other embodiments, the excess coating composition may fall away from the cushioning element 102 naturally (e.g., without applying a manual or mechanical stimulus). The excess coating composition, if any, may be collected and reused to coat other cushioning elements 102.

For example, after the cushioning element 102 leaves the bath 202 (FIG. 4), the cushioning element 102 may be exposed to air for a period of time to dry. In some embodiments, the cushioning element 102 may be dried for less than 1 minute, for between 1 minute and 3 minutes, for between 3 minutes and 6 minutes, for at least 10 minutes, for between about 10 minutes and about 60 minutes, or for more than 60 minutes. The length of time for which the cushioning element 102 is dried may vary based on the dimensions of the cushioning element 102, the amount of water or other material in the coating composition, the temperature at which the cushioning element 102 is dried, or any other parameter. Drying the cushioning element 102 may cause evaporation of the water or other material from the coating composition, leaving the coating material on surfaces of the cushioning element 102. In some embodiments, the cushioning element 102 may be dried by passing heated air over it, such as by using fans and/or electric heating elements. In other embodiments, such as when the cushioning element 102 is coated immediately after formation (e.g., after removal from a mold), the cushioning element 102 may be warm when coated, and heat of the cushioning element 102 may contribute to drying the cushioning element 102. Though heat and air circulation may be used to dry the cushioning element 102, neither is required. That is, the cushioning element 102 may be dried even without heat or air circulation.

In some embodiments, the coating composition as received from a supplier may include water or another solvent. Additional water may be added to the coating composition to yield any selected concentration. For example, if the coating composition is received as a slurry, the slurry may be diluted by adding from about 2% to about 25% slurry with from about 75% to about 98% water, by weight, such as from about 5% to about 15% slurry with from about 85% to about 95% water. Increasing the amount of water in the coating composition may decrease the amount of the coating material that remains on the cushioning element 102 after drying. Thus, the beneficial effect of coating the cushioning element 102 may be achieved using less of the coating material, which may decrease material costs and weight.

In some embodiments, the coating material provided on the cushioning element 102 may tint or discolor the surface of the cushioning element 102 such that it may be visibly discerned that the cushioning element 102 has been coated. In other embodiments, the coating material provided on the cushioning element 102 may not be visible. For example, an amount of coating material remaining on the cushioning element 102 after drying a coating composition having at least 95% water by weight may not be visible to the naked eye. The amount of coating material may be selected such that the coating material does not flake off, bleed onto adjacent materials, discolor the cushioning element 102, or have a detectable odor. In certain embodiments, the coating material may enhance the generally nonsticky feel of the surface of the cushioning element 102. In some embodiments, a person familiar with the feel of coated and uncoated material of the cushioning elements may discern by touching or rubbing the cushioning element 102 whether a particular cushioning element includes the coating material.

In some embodiments, the cushioning element 102 may have a ratio of a mass of the coating material to a mass of the elastomeric material ratio from about 0.01:100 to about 3.0:100, such as from about 0.1:100 to about 1.5:100, or about 0.7:100.

At action 128, additional layers may be provided above and/or below the cushioning element 102. In some embodiments, the top layer 104 may be formed (e.g., attached) over the top surface 103 of the cushioning element 102, and the bottom layer 106 may be formed (e.g., attached) under the bottom surface 105 of the cushioning element 102 (see FIG. 1).

Cushioning elements 102 described herein may have advantages over uncoated cushioning elements. For example, cushioning elements 102 having a coating material thereon and provided in the cushion 100 that is subsequently compressed, packaged, and removed from the packaging, may return to the expanded form immediately and/or in less than eight hours. Further, the buckling walls 108 may separate without manual or mechanical forces being applied, that is, when the cushioning element 102 is left undisturbed after removal from its packaging. This quick expansion without additional end-user manipulation may allow for immediate use of the cushion 100, and may make roll-packing of cushions a more beneficial shipping option.

In some embodiments, the coating composition may be used as a lubricant for a wet saw. That is, after the cushioning element 102 is coated, and typically before the cushioning element 102 is dried, the cushioning element 102 may be cut to a selected size and shape. The coating composition may limit or prevent binding of the elastomeric material of the cushioning element 102 on a saw blade as the saw blade cuts the cushioning element 102. Production time and costs may be decreased because a separate lubricant need not be supplied. Furthermore, wash and dry cycles typically associated with conventional cutting lubricants may be avoided.

Comparative Examples

In experiments, a cushion having an elastomeric cushioning element without any coating provided on a surface thereof was roll-packed by the process as described in U.S. patent application Ser. No. 15/063,114. After the cushion was roll-packed in the compressed form, the cushion was packaged, and subsequently removed from the packaging such that the cushion could return to its original size and shape. However, the cushion failed to return to its original size and shape within eight hours. In other similar experiments conducted on cushions including an uncoated elastomeric cushioning element, some cushions failed to return to the original size and shape within 30 days, and other cushions never returned to the original size and shape without manually pulling apart the buckling walls.

In other experiments, an elastomeric cushioning element was coated with a talc powder, which is a common antiblock additive. The cushion including the talc-coated cushioning element, was similarly roll-packed, packaged, and subsequently removed from the packaging such that the cushion could return to its original size and shape. Similar to the uncoated elastomeric cushioning element, the buckling walls of the cushion did not unstick, and the cushion failed to return to its original size and shape within eight hours. Generally, no improvement was observed between the uncoated elastomeric cushioning element and the talc-coated elastomeric cushioning element.

In yet further experiments, an elastomeric cushioning element was coated with surfactants such as glycerin and DAWN® dishwashing liquid. The cushion including the surfactant-coated cushioning element, was similarly roll-packed, packaged, and subsequently removed from the packaging such that the cushion could return to its original size and shape. Similar to the uncoated and talc-coated elastomeric cushioning element, the buckling walls of the cushion did not unstick, and the cushion failed to return to its original size and shape within eight hours. Generally, no improvement was observed between the surfactant-coated elastomeric cushioning element, the uncoated elastomeric cushioning element, and the talc-coated elastomeric cushioning element.

Working Example

A mattress as illustrated in FIG. 1 was formed in accordance with a method as described herein. The mattress included an elastomeric cushioning element formed of an elastomeric mixture of plasticizer and polymer. The mixture included a plasticizer-to-polymer ratio of 4:1 by weight. The plasticizer comprised 70-weight oil, and the polymer comprised KRATON® E1830. The mixture also included pigment and antioxidants. The elastomeric mixture was subsequently provided with a filler. The filler comprised approximately 17% by volume hollow glass microspheres having a specific gravity of 0.4. The cushioning element formed of the elastomeric mixture and filler was coated with a coating composition of 5% RuberZol RA 137 (from Ocean Chemical Industry, of Sao Paulo, Brazil) to 95% water by weight, by immersing the cushioning element in a horse trough containing the coating composition for about 30 seconds. The cushioning element was removed from the horse trough, and excess coating composition was allowed to drip off the cushioning element into a drip tray. The cushioning element was allowed to dry by circulating air heated to about 120° F. (about 49° C.) for about 30 minutes adjacent the cushioning element. The cushioning element was formed as part of the mattress by attaching the cushioning element to foam layers and inserting the cushioning element and foam layers in a knitted fabric as described in U.S. patent application Ser. No. 15/062,621. The mattress was roll-packaged, left in a roll-packed state for 42 days, and subsequently unpackaged. Once unpackaged, the mattress was unrolled and allowed to return to its original size and shape (e.g., the expanded form). The mattress and, more particularly, the cushioning element having the coating material thereon, returned to the expanded form immediately or at least in less than eight hours without manually or mechanically pulling the buckling walls apart.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the disclosure as contemplated by the inventors.

What is claimed is:

1. A cushion, comprising:

a cushioning element comprising an elastomeric material forming a plurality of intersecting buckling walls defining a plurality of hollow columns in an expanded form, wherein the elastomeric material comprises an elastomeric polymer and a plasticizer comprising oil; and a coating material comprising stearic acid, a metal stearate, propylene glycol, and triethanolamine on at least one surface of the intersecting buckling walls to prevent the at least one surface from sticking to other surfaces of the intersecting buckling walls.

2. The cushion of claim 1, wherein a ratio of a mass of the coating material to a mass of the elastomeric material is from about 0.1:100 to about 3.0:100.

3. The cushion of claim 2, wherein a ratio of a mass of the coating material to a mass of the elastomeric material is about 0.7:100.

4. The cushion of claim 1, wherein the cushioning element is packaged into a compressed form.

5. A compressed cushion, comprising a cushioning element comprising an elastomeric material compressed into a package, wherein the elastomeric material comprises an elastomeric polymer and a plasticizer comprising oil; and a coating provided on a surface of the cushioning element, comprising stearic acid, a metal stearate, propylene glycol, and triethanolamine, the coating preventing the surface from sticking to other surfaces of the cushioning element while the cushioning element is in a compressed state.

6. The compressed cushion of claim 5, wherein the cushioning element comprises a plurality of intersecting buckling walls pressed together when the cushioning element is compressed into the package.

7. The compressed cushion of claim 5, further comprising a foam base secured to the cushioning element.

8. The compressed cushion of claim 5, further comprising a fabric adjacent to the cushioning element.

9. A cushion, comprising:

a cushioning element comprising an elastomeric material comprising an elastomeric polymer and a plasticizer comprising oil, the elastomeric material forming a plurality of intersecting buckling walls, the cushioning element having an expanded state in which the plurality of intersecting buckling walls define a plurality of hollow columns and a compressed state in which surfaces of the plurality of intersecting buckling walls contact each other; and a coating composition comprising a blend of fatty acids and a magnesium stearate, the coating composition provided over the surfaces of the plurality of intersecting buckling walls to hinder adhesion of the surfaces that contact each other when the cushioning element is in the compressed state.

10. The cushion of claim 9, wherein a ratio of a mass of the coating composition to a mass of the elastomeric material is from about 0.1:100 and 3.0:100.

11. The cushion of claim 9, wherein a ratio of a mass of the coating composition to a mass of the elastomeric material is about 0.7:100.

12. The cushion of claim 9, further comprising:

at least one layer of foam superimposed with the cushioning element.

13. The cushion of claim 12, wherein the at least one layer of foam comprises a bottom layer of foam beneath a bottom surface of the cushioning element.

14. The cushion of claim 13, wherein the at least one layer of foam comprises:

a top layer of foam over a top surface of the cushioning element; and the bottom layer of foam beneath the bottom surface of the cushioning element.

15. The cushion of claim 9, wherein the blend of fatty acids comprises stearic acid.

16. The cushion of claim 9, wherein the coating composition further comprises propylene glycol.

17. The cushion of claim 9, wherein the coating composition comprises triethanolamine.

18. The cushion of claim 9, wherein the coating composition is provided over all surfaces of the intersecting buckling walls.

19. A cushion, comprising:

a cushioning element comprising an elastomeric material comprising an elastomeric polymer and a plasticizer comprising oil, the elastomeric material forming a plurality of intersecting buckling walls, the cushioning element having an expanded state in which the plurality of intersecting buckling walls define a plurality of hollow columns and a compressed state in which surfaces of the plurality of intersecting buckling walls contact each other; and a coating composition comprising a blend of fatty acids, a metal stearate, and triethanolamine, the coating composition provided over the surfaces of the plurality of intersecting buckling walls to hinder adhesion of the surfaces that contact each other when the cushioning element is in the compressed state.

20. The cushion of claim 19, wherein the blend of fatty acids comprises stearic acid.

21. The cushion of claim 19, wherein the coating composition is provided over all surfaces of the plurality of intersecting buckling walls.

* * * * *